US012126016B2

(12) United States Patent
Wang et al.

(10) Patent No.: US 12,126,016 B2
(45) Date of Patent: Oct. 22, 2024

(54) POSITIVE ELECTRODE MATERIAL, ELECTROCHEMICAL DEVICE CONTAINING SAME, ELECTRONIC DEVICE, AND METHOD FOR PREPARING THE POSITIVE ELECTRODE MATERIAL

(71) Applicant: Ningde Amperex Technology Limited, Ningde (CN)

(72) Inventors: Kai Wang, Ningde (CN); Fei Zhang, Ningde (CN); Meng Wang, Ningde (CN); Leimin Xu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 878 days.

(21) Appl. No.: 17/281,046

(22) PCT Filed: Mar. 31, 2020

(86) PCT No.: PCT/CN2020/082424
§ 371 (c)(1),
(2) Date: Mar. 29, 2021

(87) PCT Pub. No.: WO2021/195961
PCT Pub. Date: Oct. 7, 2021

(65) Prior Publication Data
US 2022/0123291 A1    Apr. 21, 2022

(51) Int. Cl.
*H01M 4/505* (2010.01)
*H01M 4/525* (2010.01)
(Continued)

(52) U.S. Cl.
CPC ........... *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2013/0047721 A1* 2/2013 Nagai ..................... H01M 4/13
73/32 R
2018/0166687 A1* 6/2018 Chang ................... H01M 4/505

FOREIGN PATENT DOCUMENTS

CN          1988222 A      6/2007
CN        102714305 A    10/2012
(Continued)

OTHER PUBLICATIONS

International Search Report and Written Opinion issued on Dec. 30, 2020 in corresponding International Application No. PCT/CN2020/082424; 8 pages.

*Primary Examiner* — Wyatt P McConnell
(74) *Attorney, Agent, or Firm* — Maier & Maier, PLLC

(57) ABSTRACT

A positive electrode material includes a lithium composite oxide, and the positive electrode material comprises stress relief particles. There are cavities inside the stress relief particles, and the cavities are closed structures. The positive electrode material that includes the stress relief particles can be used to effectively tackle a stress and relieve the stress in advance, relieve a strain of the positive electrode material used at a high voltage, avoid ruptures of particles of the positive electrode material, and enhance structural stability of the positive electrode material. The positive electrode material and the electrochemical device having the positive electrode material achieve good high-voltage cycle performance and cycle stability.

16 Claims, 3 Drawing Sheets

(51) Int. Cl.
*H01M 10/0525* (2010.01)
*H01M 4/02* (2006.01)

(56) References Cited

FOREIGN PATENT DOCUMENTS

| | | |
|---|---|---|
| CN | 106450260 A | 2/2017 |
| CN | 108183233 A | 6/2018 |
| CN | 110050366 A | 7/2019 |
| JP | H04-28162 A | 1/1992 |

* cited by examiner

POSITIVE ELECTRODE MATERIAL, ELECTROCHEMICAL DEVICE CONTAINING SAME, ELECTRONIC DEVICE, AND METHOD FOR PREPARING THE POSITIVE ELECTRODE MATERIAL

CROSS REFERENCE TO RELATED APPLICATIONS

The present application is a National Stage application of PCT international application: PCT/CN2020/082424 filed on 31 Mar. 2020, the disclosure of which is hereby incorporated by reference in its entirety.

TECHNICAL FIELD

This application relates to the technical field of energy storage, and in particular, to a positive electrode material, an electrochemical device containing same, an electronic device, and a method for preparing the positive electrode material.

BACKGROUND

With rapid development of mobile electronic technologies, people are using a mobile electronic device such as a mobile phone, a tablet computer, a notebook computer, and an unmanned aerial vehicle more often and people's experience requirements are increasingly higher. Therefore, an electrochemical device (such as a lithium-ion battery) that provides energy for the electronic device needs to provide a higher energy density, a higher C-rate, higher safety, and less fading of capacity that occurs after repeated charge and discharge cycle processes.

The energy density and cycle performance of the electrochemical device are closely related to a positive electrode material thereof. Therefore, people keep researching and improving the positive electrode material. In addition to seeking a new type of positive electrode material, improvement and optimization of a composition of the positive electrode material are also an important solution.

During a charge and discharge cycle, deintercalation of lithium ions in the positive electrode material can induce a strong stress and strain. When a voltage applied to the positive electrode material is increasingly higher, an amount of lithium ions deintercalated in the positive electrode material increases, and the stress on the positive electrode material also increases. If the stress is deficiently relieved during a charge and discharge cycle, the increasingly accumulated stress is likely to rupture particles of the positive electrode material. Lithium ions and electrons are unable to be continuously transmitted between the ruptured particles, thereby increasing an internal resistance of the electrochemical device and decreasing a capacity of the electrochemical device.

However, current research and development on the electrochemical device (such as a lithium-ion battery) mainly focus on an energy density. The prior art focuses on improving the composition of the positive electrode material or on preparing a positive electrode material of denser particles to enhance the energy density or conductivity of the positive electrode material and enhance performance of the lithium-ion battery. However, when the particles of the positive electrode material are denser, a strain-resistant capability during a charge and discharge cycle is lower, and electrochemical performance is more likely to lose due to ruptures of the particles of the positive electrode material. Therefore, structural stability and the strain-resistant capability of the positive electrode material urgently need to be further researched and improved.

SUMMARY

This application provides a positive electrode material, an electrochemical device containing the positive electrode material, an electronic device, and a method for preparing the positive electrode material in an attempt to solve at least one problem in the related art to at least some extent.

According to an aspect of this application, this application provides a positive electrode material. The positive electrode material includes a lithium composite oxide represented by a general formula $Li_xCo_aM_bO_{2-c}$, where the M element includes at least one of nickel (Ni), manganese (Mn), magnesium (Mg), aluminum (Al), Titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), or silicon (Si), and values of x, a, b, and c are in the following ranges: $0.8 \le x \le 1.2$, $0.8 \le a \le 1$, $0 \le b \le 0.2$, $-0.1 \le c \le 0.2$, respectively; and the positive electrode material includes stress relief particles, there are cavities inside the stress relief particles, and the cavities are closed structures.

According to an aspect of this application, this application provides a method for preparing a positive electrode material, including following steps: mixing lithium carbonate and a cobalt-containing oxide precursor; stirring an obtained mixture; sintering the stirred mixture at a high temperature, where an air flow speed during the sintering is 50 mL/min to 500 mL/min; and performing milling and sifting to obtain a positive electrode material including stress relief particles.

According to an aspect of this application, this application provides an electrochemical device, including a negative electrode, a separator, and a positive electrode. The positive electrode includes the positive electrode material.

According and another aspect of this application, this application provides an electronic device. The electronic device includes the electrochemical device.

In the embodiments of this application, the stress relief particles containing closed cavities are introduced in the positive electrode material, so that the positive electrode material can effectively relieve the stress applied to it during cycles, thereby enhancing stability of the positive electrode material.

Additional aspects and advantages of the embodiments of this application will be described or illustrated in part later herein or expounded through implementation of the embodiments of this application.

BRIEF DESCRIPTION OF THE DRAWINGS

For ease of describing the embodiments of this application, the following outlines the drawings necessary for describing the embodiments of this application or the prior art. Apparently, the drawings outlined below are merely a part of embodiments in this application. Without making any creative efforts, a person skilled in the art can still obtain the drawings of other embodiments according to the structures illustrated in these drawings.

DETAILED DESCRIPTION OF EMBODIMENTS

Figure 1:
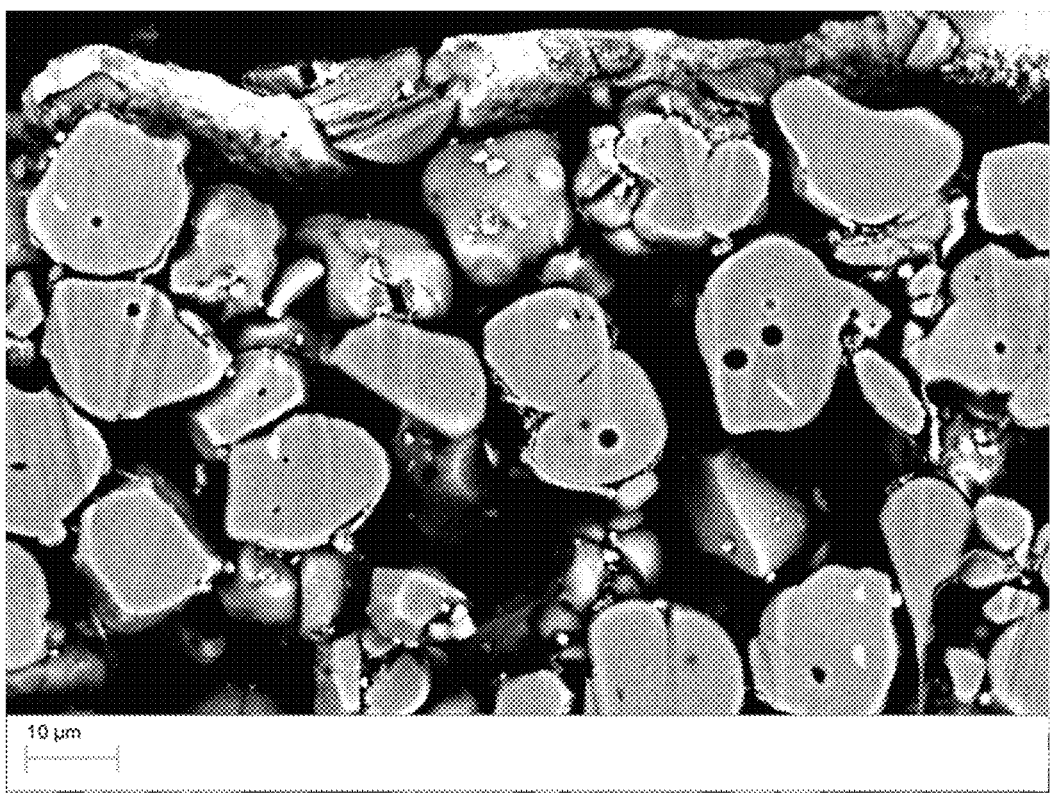
FIG. 1 is a scanning electron microscope (SEM) image of a positive electrode material according to Embodiment 5 of this application.

Embodiments of this application will be described in detail below. Throughout the specification of this application, the same or similar components and the components having the same or similar functions are denoted by similar reference numerals. The embodiments described herein with reference to the accompanying drawings are illustrative and graphical in nature, and are intended to enable a basic understanding of this application. The embodiments of this application shall not be construed as a limitation on this application.

In addition, a quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each sub-range were explicitly specified.

In the description of embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

Currently, particles of a positive electrode material of an electrochemical device (such as a lithium-ion battery) generate a corresponding stress during deintercalation of lithium ions. The accumulated stress may cause the particles of the positive electrode material to rupture, thereby affecting cycle performance of the electrochemical device. By adjusting a process of preparing the positive electrode material, this application causes a specific quantity of cavities of a specific size to exist inside a part of particles (that is, stress relief particles) of the positive electrode material (such as a lithium composite oxide). The cavities are closed and non-open structures (such as through-holes), and form a buffer region of the positive electrode material against the stress during the deintercalation of the lithium ions. The buffer region relieves a strain of the positive electrode material used at a high voltage, thereby avoiding ruptures of the particles of the positive electrode material and achieving better high-voltage cycle performance.

According to an aspect of this application, an embodiment of this application provides a positive electrode material. By adjusting a process of preparing the positive electrode material, this embodiment of this application causes the positive electrode material to include stress relief particles, so that the positive electrode material is capable of relieving a stress under a high voltage, enhances structural stability of the positive electrode material, and ensures cycle stability under a high voltage.

In some embodiments, the positive electrode material includes a lithium composite oxide represented by a general formula $Li_xCo_aM_bO_{2-c}$, where the M element includes at least one of nickel (Ni), manganese (Mn), magnesium (Mg), aluminum (Al), Titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), or silicon (Si), and values of x, a, b, and c are in the following ranges: $0.8 \leq x \leq 1.2$, $0.8 \leq a \leq 1$, $0 \leq b \leq 0.2$, $-0.1 \leq c \leq 0.2$, respectively; and the positive electrode material includes stress relief particles, there are cavities inside the stress relief particles, and the cavities are closed structures.

The cavities of the stress relief particles of the positive electrode material provided in this application are mainly distributed inside the particles, without increasing risks of side reactions between the positive electrode material and an electrolytic solution. Inside particles of a positive electrode material synthesized in the prior art, no cavities exist or the cavities are not closed structures. Under the same use conditions, such positive electrode material is inferior in resisting a stress under a high voltage and achieves inferior cycle performance. In addition, the stress relief particles in this application are formed by controlling sintering conditions (for example, a speed of an air flow introduced during a sintering process, and a sintering temperature) in a preparation process, so that the cavities in the particles meet characteristics of "(longest diameter−shortest diameter)/longest diameter≤30%, with the longest diameter being at least 100 nm", that is, the cavities are hollow structures that are highly stable and shaped like spheres. However, in the prior art, ducts or pores are formed between the particles of the positive electrode material (for example, by using a material that can be decomposed during sintering). Consequently, the shape and distribution of the formed ducts or cavities are uncontrollable, and the strain cannot be buffered effectively and homogeneously. In addition, the ducts or pores formed between the particles of the positive electrode material are mostly open pores, and are inferior in resisting the strain. Further, in contrast with the technical solution in the prior art in which organic polymers are introduced to generate a pore and duct structure in the particles, the preparation process in this application generates cavities by controlling and using a gas generated by the lithium composite oxide itself during the sintering, thereby avoiding introducing additional interference factors. For example, the organic polymers may decompose at a high temperature to generate residues such as carbon, and affect the structural stability and surface/interface stability of the material. In addition, a density of materials such as the organic polymers is different from that of the lithium composite oxide. Therefore, such materials are likely to cause problems such as inhomogeneous mixing of the materials, and affect distribution homogeneity of the manufactured cavities and the like.

The cavities are located inside the particles of the positive electrode material. Therefore, in contrast with the pore structure between the particles of the positive electrode material, the cavities can give more support to individual particles of the positive electrode material, and can also effectively buffer the strain. In addition, the cavities can avoid friction or extrusion between the particles, thereby maintaining integrity of the particles, suppressing surface defects such as microcracks and voids in the particles, and reducing surface side reactions under a high voltage.

In this embodiment of this application, the particle size Dv50 of the positive electrode material is measured by a laser particle size test. The laser particle size test is to measure a particle distribution based on a principle that particles of different sizes can cause a laser beam to scatter at different intensities. Dv50 represents a particle size of the material at a cumulative volume of 50% in a volume-based particle size distribution as measured by starting from small particle sizes.

In some embodiments, the particle size Dv50 of the positive electrode material is 3 μm to 25 μm. In other embodiments, the particle size Dv50 of the positive electrode material is 5 μm to 22 μm. In other embodiments, the particle size Dv50 of the positive electrode material is 10 μm to 20 μm. In other embodiments, the particle size Dv50 of the positive electrode material is 12 μm, 13 μm, 14 μm, 15 μm, 16 μm, 17 μm, 18 μm, or a range formed by any two of such values. In other embodiments, the particle size Dv50 of the positive electrode material is preferably 15 μm.

In some embodiments, the particle size Dv50 of the stress relief particles is 3 μm to 25 μm. In other embodiments, the particle size Dv50 of the stress relief particles is 5 μm to 22 μm. In other embodiments, the particle size Dv50 of the stress relief particles is 10 μm to 20 μm. In other embodiments, the particle size Dv50 of the stress relief particles is 12 μm, 13 μm, 14 μm, 15 μm, 16 μm, 17 μm, 18 μm, or a range formed by any two of such values. In other embodiments, the particle size Dv50 of the stress relief particles is preferably 15 μm.

According to an aspect of this application, some embodiments of this application provide a positive electrode that includes the positive electrode material according to this application.

In the embodiments of this application, an ion beam cross section polisher (CP) is used to obtain a cross section of the positive electrode, and a scanning electron microscope (SEM) is used to measure a quantity of particles of the positive electrode material, a quantity of stress relief particles, a quantity of cavities, and a shape of the cavities in the cross section of the positive electrode. For specific statistical and test methods, refer to "1.2 Methods for preparing and counting a cross section" in the specific embodiments below.

In some embodiments, 2-30 stress relief particles are included in 100 particles of the positive electrode material. That is, a quantity percent of the stress relief particles in the particles of the positive electrode material is 2%-30%. In other embodiments, the quantity percent of the stress relief particles in the particles of the positive electrode material is 3%-10%. In other embodiments, the quantity percent of the stress relief particles in the particles of the positive electrode material is 4%-30%. Without being limited by any theory, the quantity percent of the stress relief particles in the particles of the positive electrode material according to this application is preferably 5%.

In some embodiments, a shape of a cross section of a cavity on a scanning electron microscope image satisfies the following relational expression: (a longest diameter of the cavity−a shortest diameter of the cavity)/the longest diameter of the cavity≤30%, where the longest diameter and the shortest diameter of the cavity are the longest diameter and the shortest diameter that respectively pass through an area centroid of the cross section of the cavity. In some embodiments, the longest diameter of the cavity is larger than at least 100 nm.

In some embodiments, there are Np cavities inside each stress relief particle, where 0<Np≤500. In other embodiments, 1≤Np≤100. In other embodiments, 1≤Np≤10.

In some embodiments, in a cross section of a positive active material layer in a thickness direction, with the cross section being obtained by using an ion beam cross section polisher, a total quantity of the cavities in 100 particles of the positive electrode material is 20 to 1,000. In other embodiments, a total quantity of cavities in 100 particles of the positive electrode material is 50-500. In other embodiments, the total quantity of cavities in 100 particles of the positive electrode material is 100-300. In other embodiments, the total quantity of cavities in 100 particles of the positive electrode material is preferably 200. If statistic results show that the total quantity of cavities in 100 particles of the positive electrode material is less than 20, it indicates that a majority of the particles of the positive electrode material do not contain this structure, and a strain-resistant capability of the positive electrode material is not significantly improved. If the statistic results show that the total quantity of cavities in 100 particles of the positive electrode material is higher than 1000, each particle of the positive electrode material contains a large quantity of cavities on average, and the particle structure is too loose. This may cause a collapse, and affect the application of the material. When the total quantity of cavities in 100 particles of the positive electrode material is in a range of 20 to 1000, the positive electrode material is highly strain-resistant while maintaining a stable particle structure. Without being limited by any theory, when the total quantity of cavities in 100 particles of the positive electrode material is 200, this application can maximize the strain-resistant capability of the material.

In some embodiments, in the cross section of the positive active material layer in the thickness direction, with the cross section being obtained by using the ion beam cross section polisher, a total cross-sectional area of the 100 particles of the positive electrode material is S1, a total cross-sectional area of the cavities in the 100 particles of the positive electrode material is S0, and a ratio (S0/S1) of the total cross-sectional area (S0) of the cavities in the 100 particles of the positive electrode material to the total cross-sectional area (S1) of the 100 particles of the positive electrode material is 0.00001% to 0.3%. In other embodiments, the S0/S1 ratio is 0.0001% to 0.2%. In other embodiments, the S0/S1 ratio is 0.001% to 0.1%. In other embodiments, the S0/S1 ratio is approximately, for example, 0.01%, 0.02%, 0.03%, 0.04%, 0.05%, 0.06%, 0.07%, or a range formed by any two of such values. If the S0/S1 ratio is less than 0.00001%, it indicates that an average size of internal cavities is too small to exert the strain-resistant capability. When the S0/S1 ratio is greater than 0.3%, it indicates that the average size of the internal cavities is too large, and may cause the collapse of the particle structure of the positive electrode material. When the S0/S1 ratio is in a range of 0.00001% to 0.3%, the positive electrode material is highly strain-resistant while maintaining a stable particle structure. Without being limited by any theory, when the S0/S1 ratio is 0.02%, the positive electrode material that contains internal cavities achieves the highest strain-resistant capability under a high voltage.

In this application, the positive electrode material that is a lithium composite oxide including stress relief particles is obtained by selecting a cobalt-containing oxide precursor whose tapped density is within a specific range, mixing the lithium carbonate and the cobalt-containing oxide precursor at a specific ratio, and controlling mixture sintering conditions such as an air flow speed.

In some embodiments, the method for preparing the positive electrode material in this application includes the following steps:

Taking a specific amount of cobalt-containing oxide precursor ($Co_3O_4$), mixing the precursor with a lithium salt (such as lithium carbonate) and a doping ingredient at a substrate stoichiometric ratio, and then stirring the mixture for 6 to 24 hours until the mixture is homogeneous (that is, until the mixture is free from obvious agglomeration and separation); and then performing sintering, and introducing an air atmosphere or an inert atmosphere during heat treatment of sintering, where a sintering temperature is 500° C. to 1100° C., a sintering time is 6 to 72 hours, and an air flow speed of the introduced air atmosphere or inert atmosphere is 50 to 500 mL/min after the sintering, cooling, milling, and sifting the obtained sintered product to obtain a positive electrode material including stress relief particles.

In some embodiments, the cobalt-containing oxide precursor is loose and porous particles that have a tapped density of 1.6 to 2.8 g/cm$^3$. In other embodiments, the cobalt-containing oxide precursor has a tapped density of 1.8 to 2.6 g/cm$^3$. In other embodiments, the cobalt-containing oxide precursor has a tapped density of 2.0 to 2.3 g/cm$^3$. In other embodiments, the cobalt-containing oxide precursor has a tapped density of 2.3 g/cm$^3$.

In some embodiments, the cobalt-containing oxide precursor is tricobalt tetraoxide.

In some embodiments, the lithium salt is an inorganic acid salt. In some embodiments, the lithium salt is lithium carbonate.

In some embodiments, in the step of mixing the lithium carbonate and the cobalt-containing oxide precursor, a molar ratio of lithium to cobalt (Li/Co) in the lithium salt and the cobalt-containing oxide precursor is 0.9 to 1.06. In other embodiments, the molar ratio of lithium to cobalt in the lithium salt and the cobalt-containing oxide precursor is 1.0 to 1.05. In other embodiments, the molar ratio of lithium to cobalt in the lithium salt and the cobalt-containing oxide precursor is 1.01 to 1.03.

In some embodiments, the sintering time is 6 to 72 hours. In other embodiments, the sintering time is 18 to 60 hours. In other embodiments, the sintering time is 20 to 30 hours. In other embodiments, the sintering time is 22 to 28 hours. In other embodiments, the sintering time is 24 hours.

In some embodiments, the sintering is one-time sintering. In some embodiments, the sintering is two-time sintering, and further includes: cooling, milling, and sifting the obtained first-time sintered product after the first-time sintering; then adding the doping ingredient, and stirring the mixture in a ball mill agitation tank for 6 hours until homogeneity; heating the stirred mixture at a speed of 5K/min in an air atmosphere; controlling the air flow speed to 60 mL/min; keeping the mixture at 600° C. for 8 hour, and then cooling the mixture until a normal temperature, and taking it out.

In some embodiments, the air flow speed for sintering is 50 mL/min to 500 mL/min. In other embodiments, the air flow speed for sintering is 50 mL/min to 350 mL/min. In other embodiments, the air flow speed for sintering is 60 mL/min to 330 mL/min. In other embodiments, the air flow speed for sintering is 150 mL/min to 310 mL/min. In other embodiments, the air flow speed for sintering is 300 mL/min.

In some embodiments, the air atmosphere or inert atmosphere is air, carbon dioxide, or inert gas. In some embodiments, a partial pressure of oxygen in the air atmosphere or inert atmosphere is at most 0.2. According to the atmosphere of the sintering process, an interior of the closed cavities in the stress relief particles in this application may be a vacuum or an atmosphere existent in a process of forming the cavities.

In some embodiments, a criterion of the sieve is 100 meshes to 500 meshes.

Understandably, without departing from the spirit of this application, the steps in the method for preparing the positive electrode material in the embodiments of this application may be selected according to specific requirements, or may replace other conventional processing methods in the art without limitation.

According to another aspect of this application, some embodiments of this application further provide an electrochemical device that includes the positive electrode material according to this application. In some embodiments, the electrochemical device is a lithium-ion battery. The lithium-ion battery includes: a negative electrode, a separator, and a positive electrode. The separator is disposed between the positive electrode and the negative electrode. In some embodiments, the positive electrode includes the positive electrode material in the foregoing embodiments and a positive current collector.

In some embodiments, the positive current collector may be an aluminum foil or a nickel foil, and the negative current collector may be a copper foil or a nickel foil. However, other positive current collectors and negative current collectors commonly used in the art may also be used without limitation.

In some embodiments, the negative electrode includes a negative electrode material capable of absorbing and releasing lithium (Li) (hereinafter sometimes referred to as "negative electrode material capable of absorbing/releasing lithium Li"). Examples of the negative electrode material capable of absorbing/releasing lithium (Li) may include a carbon material, a metal compound, an oxide, a sulfide, a lithium nitride such as $LiN_3$, a lithium metal, a metal that combines with lithium into an alloy, and a polymer material.

In some embodiments, the positive electrode and the negative electrode each can independently further include at least one of a binder and a conductive agent.

In some embodiments, the binder includes at least one of a polyvinylidene fluoride, a vinylidene fluoride-hexafluoropropylene copolymer, a polyamide, a polyacrylonitrile, a polyacrylic ester, a polyacrylic acid, a sodium polyacrylate, a sodium carboxymethyl cellulose, a polyvinylpyrrolidone, a polyvinyl ether, a poly methyl methacrylate, a polytetrafluoroethylene, a polyhexafluoropropylene, and styrene butadiene rubber. In some embodiments, the conductive agent includes at least one of a carbon nanotube, a carbon fiber, conductive carbon black, acetylene black, graphene, and Ketjen black. Understandably a person skilled in the art may select a conventional binder and a conventional conductive agent according actual needs without limitation.

In some embodiments, the separator includes, but is not limited to, at least one of polyethylene, polypropylene, polyethylene terephthalate, polyimide, and aramid. For example, the polyethylene includes a component selected from at least one of high-density polyethylene, low-density polyethylene, and ultra-high-molecular-weight polyethylene. Especially the polyethylene and the polypropylene are highly effective in preventing short circuits, and improve stability of the lithium-ion battery through a shutdown effect.

The lithium-ion battery according to this application further includes an electrolyte. The electrolyte may be one or more of a gel electrolyte, a solid-state electrolyte, and an electrolytic solution. The electrolytic solution includes a lithium salt and a nonaqueous solvent.

In some embodiments, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt is $LiPF_6$ because it provides a high ionic conductivity and improves cycle characteristics.

The nonaqueous solvent may be a carbonate compound, a carboxylate compound, an ether compound, another organic solvent, or any combination thereof.

The carbonate compound may be a chain carbonate compound, a cyclic carbonate compound, a fluorocarbonate compound, or any combination thereof.

Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, and any combination thereof.

In some embodiments, the nonaqueous solvent is selected from groups that each include ethylene carbonate, propylene carbonate, diethyl carbonate, dimethyl carbonate, ethyl methyl carbonate, propylene carbonate, methyl acetate, ethyl propionate, propyl propionate, and any combination thereof.

Understandably, the method for preparing the positive electrode, the negative electrode, the separator, and the lithium-ion battery in the embodiments of this application may be, but without limitation, any appropriate conventional method in the art according to specific requirements without departing from the spirit of this application. In an implementation of the method for manufacturing an electrochemical device, the method for preparing a lithium-ion battery includes: winding, folding, or stacking the positive electrode, the separator, and the negative electrode in the foregoing embodiments sequentially into an electrode assembly; putting the electrode assembly into, for example, an aluminum laminated film, and injecting an electrolytic solution; and then performing steps such as vacuum packaging, static standing, formation, and reshaping to obtain a lithium-ion battery.

Although the lithium-ion battery is used as an example for description above, a person skilled in the art after reading this application can learn that the positive electrode material in this application is applicable to other suitable electrochemical devices. Such electrochemical devices include any device in which an electrochemical reaction occurs. Specific examples of the devices include all kinds of primary batteries, secondary batteries, fuel batteries, solar batteries, or capacitors. In particular, the electrochemical apparatus is a lithium secondary battery, including a lithium metal secondary battery, a lithium-ion secondary battery, a lithium polymer secondary battery, or a lithium-ion polymer secondary battery.

Some embodiments of this application further provide an electronic device. The electronic device includes the electrochemical device in the embodiments of this application.

The electronic device configured to include the electrochemical device in the embodiments of this application may be any electronic device in the prior art without being specifically limited. In some embodiments, the electronic device may include, but without limitation, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

EMBODIMENTS

The following enumerates some specific embodiments and comparative embodiments to better describe the technical solution of this application. In the embodiments and comparative embodiments, a laser particle size analysis is performed on a positive electrode material, and an ultimate compacted density test, a cycle performance test, and a storage expansion rate test are performed on an electrochemical device (a lithium-ion battery).

I. Test Methods 1.1 Particle Size Analysis

In the embodiments and comparative embodiments of this application, a particle size of sample particles is analyzed by using a Mastersizer 2000 laser particle size distribution analyzer. The test steps include: dispersing samples of the positive electrode material in 100 mL of dispersant (deionized water) so that a shading degree is 8% to 12%; then ultrasonically treating the samples at an ultrasonic intensity of 40 KHz and 180 W for 5 minutes; and analyzing the laser particle size distribution of the samples after the ultrasonic treatment, so as to obtain particle size distribution data.

1.2 Methods for Preparing and Counting a Cross Section

Using the positive electrode material in the following embodiments and comparative embodiments to prepare a positive electrode plate according to the following method:

randomly selecting 1 position on the positive electrode plate, and using an ion beam cross section polisher (JEOL-IB-09010CP) to process the selected position to obtain a cross section; using a scanning electron microscope (SEM; Zeiss Sigma 02-33) to photograph a cross section to obtain an SEM image, where a photographing magnification is preferably 1.0 K, a photographing mode is preferably a backscatter diffraction (BSD) mode, and an electron beam voltage is preferably 20 KV;

selecting particles: selecting 100 complete particles from all particles in the obtained SEM image cross section from top to bottom and from left to right, and using the selected particles as statistic objects (the selected particles are completely presented in the SEM image), where the selected particles meet the following condition: among straight lines formed by connecting any two points at an edge of the SEM image of the particles, a length of at least one straight line is not less than 1 µm (converted into an actual length according to the scale); if less than 100 particles meet the condition, repeating the foregoing step until 100 particles meet the condition;

counting the total quantity of cavities of the selected 100 particles, the total cross-sectional area of the 100 particles, and the total cross-sectional area of the cavities, where the cross-sectional area is counted by counting image pixels occupied by the particles or image pixels occupied by the cavities; and obtaining a ratio of the total cross-sectional area of the cavities to the total cross-sectional area of the 100 particles by using a ratio of the quantity of image pixels occupied by the cavities to the quantity of image pixels occupied by the 100 particles.

1.3 Cycle Performance Test

Manufacturing lithium-ion batteries according to the following method by using positive electrode materials disclosed in the following embodiments and comparative embodiments; taking 5 lithium-ion batteries for each group for testing, charging and discharging the lithium-ion batteries repeatedly, and calculating a capacity retention rate of the lithium-ion batteries; first, putting the lithium-ion batteries in a 25° C. environment for charging and discharging for a first time; charging the batteries at a constant current of 1 C until the voltage reaches an upper limit of 4.5 V; then discharging the batteries at a constant current of 1 C until the voltage finally reaches 3 V, thereby completing a first charge and discharge cycle process; recording a discharge capacity after the first cycle; then performing 120 charge and discharge cycles repeatedly according to the foregoing method, and recording a discharge capacity after the $120^{th}$ cycle;

120-cycle capacity retention rate of the lithium-ion batteries=the discharge capacity (mAh) after the $120^{th}$ cycle/the discharge capacity (mAh) after the first cycle×100%.

1.4 Tapped Density Test

Taking an appropriate amount of the positive electrode material disclosed in the following embodiments and comparative embodiments, loading the positive electrode material into a 100 mL graduated cylinder in a naturally falling state, and using a powder tap densitometer (Chengdu Jingxin, JZ-7) to tap the positive electrode material at a vibration frequency of 250 times per minute until the volume of the positive electrode material stops contracting; reading the volume, and dividing the mass of the positive electrode material by the volume; and repeating the test for 3 times according to the foregoing method, recording test results, and calculating an average value to obtain a tapped density.

II. Preparation Methods 2.1 Preparing a Positive Electrode

Mixing the positive electrode materials in the following embodiments and comparative embodiments with acetylene black and polyvinylidene fluoride at a mass ratio of 94:3:3, and dissolving the mixture in an N-methylpyrrolidone (NMP) solution to form a positive electrode slurry; and using an aluminum foil as a positive current collector, coating the positive electrode slurry onto the positive current collector; and performing drying, cold calendering, and cutting steps to obtain a positive electrode.

2.2 Preparing a Negative Electrode Plate

Mixing artificial graphite, acetylene black, styrene-butadiene rubber, and sodium carboxymethyl cellulose at a mass ratio of 96:1:1.5:1.5, and dissolving the mixture in deionized water to form a negative electrode slurry; and using a copper foil as a negative current collector, coating the negative electrode slurry onto the negative current collector; and performing drying, cold calendering, and cutting steps to obtain a negative electrode.

2.3 Preparing a Separator

Dissolving polyvinylidene difluoride in water, and mechanically stirring the water to form a homogeneous slurry; coating the slurry onto both sides of a porous substrate (polyethylene), with both of the sides having been coated with a ceramic coating; and performing drying to form a separator.

2.4 Preparing an Electrolytic Solution

In an environment with a water content of less than 10 ppm, mixing lithium hexafluorophosphate with a nonaqueous organic solvent (ethylene carbonate (EC):diethyl carbonate (DEC):propylene carbonate (PC):propyl propionate (PP):vinylene carbonate (VC)=20:30:20:28:2 mass ratio) at a mass ratio of 8:92 to prepare an electrolytic solution.

2.5 Preparing a Lithium-Ion Battery

Stacking the positive electrode, the separator, and the negative electrode sequentially, placing the separator between the positive electrode and the negative electrode to serve a separation function, and then winding them into an electrode assembly; putting the electrode assembly into an aluminum laminated film packaging bag, and performing drying at 80° C. to obtain a dry electrode assembly; and injecting the electrolytic solution into the dry electrode assembly, and performing steps such as vacuum packaging, static standing, formation, and reshaping to complete preparing the lithium-ion batteries in the following embodiments and comparative embodiments.

Embodiment 1

1. Mixing lithium carbonate and a cobalt-containing oxide precursor (tricobalt tetroxide) at a ratio of 1.05:1, and stirring the mixture in a ball mill agitation tank for 18 hours until homogeneity, where the cobalt-containing oxide precursor is doped with a 0.05 wt % Al element and a 0.01 wt % Mg element, and the tapped density is 2.3 g/cm³.

2. Loading the homogeneously mixed materials obtained in step 1 into a refractory box, and putting the box into a muffle oven using air as an atmosphere; increasing the temperature at a speed of 5 K/min, controlling the air flow speed to 100 mL/min, keeping the temperature at 1,000° C. for 12 hours, and then decreasing the temperature to a normal temperature, and taking the box out.

3. Pulverizing the material obtained in step 2; sifting the pulverized material, adding 0.01 wt % $Al_2O_3$, and stirring the mixture in a ball mill agitation tank for 6 hours until homogeneity.

4. Loading the mixed materials obtained in step 3 into a refractory box, and putting the box into a muffle oven using air as an atmosphere; increasing the temperature at a speed of 5 K/min, controlling the air flow speed to 150 mL/min, keeping the temperature at 600° C. for 8 hours, and then decreasing the temperature to a normal temperature, and taking the box out.

5. Pulverizing the materials taken out of the oven, and sifting the materials to obtain the positive electrode material that is a lithium composite oxide including stress relief particles according to this application.

Embodiments 2-16

The preparation method is the same as that in Embodiment 1, but differences are: in Embodiments 2-16, parameters in the preparation process in step 1 are adjusted, for example, the ratio of lithium carbonate to the cobalt-containing oxide precursor, the tapped density, the air flow speed in step 2, and the air flow speed in step 4. For the specific preparation parameters, refer to Table 1.

Embodiment 17

The preparation method is the same as that in Embodiment 1, but differences are: in step 1 in Embodiment 17, the tapped density is 3.0 g/cm³; in step 2, the air flow speed is 40 mL/min, and the temperature is reduced to the normal temperature after being kept at 750° C. for 10 hours; and in step 4, the air flow speed is 60 mL/min, and the temperature is reduced to the normal temperature after being kept at 500° C. for 8 hours.

Embodiment 18

The preparation method is the same as that in Embodiment 1, but differences are: in step 1 in Embodiment 18, the tapped density is 2.8 g/cm³; in step 2, the air flow speed is 20 mL/min; and in step 4, the air flow speed is 20 mL/min, and the temperature is reduced to the normal temperature after being kept at 500° C. for 5 hours.

Comparative Embodiment 1

The preparation method is the same as that in Embodiment 1, but differences are: in step 1 in Comparative Embodiment 1, the tapped density is 2.1 g/cm³; in step 3, the air flow speed is 30 mL/min, and the temperature is reduced to the normal temperature after being kept at 900° C. for 9 hours; and in step 5, the air flow speed is 20 mL/min

TABLE 1

| Embodiment | Molar ratio of lithium carbonate to cobalt-containing oxide precursor | Tapped density (g/cm³) | Air flow speed in step 2 (mL/min) | Air flow speed in step 4 (mL/min) |
|---|---|---|---|---|
| 1 | 1.05 | 2.3 | 100 | 150 |
| 2 | 1.05 | 2.6 | 60 | 60 |
| 3 | 1.05 | 2.8 | 500 | 350 |
| 4 | 1.05 | 1.8 | 200 | 150 |
| 5 | 1.05 | 2.1 | 90 | 60 |
| 6 | 1.05 | 2.0 | 260 | 370 |
| 7 | 1.05 | 1.8 | 350 | 150 |
| 8 | 1.05 | 1.9 | 450 | 300 |
| 9 | 1.05 | 1.7 | 400 | 450 |
| 10 | 1.05 | 1.6 | 450 | 500 |
| 11 | 1.05 | 2.7 | 80 | 60 |
| 12 | 1.05 | 2.6 | 90 | 70 |
| 13 | 1.05 | 2.3 | 80 | 60 |
| 14 | 1.05 | 2.0 | 80 | 70 |
| 15 | 1.05 | 1.8 | 100 | 80 |
| 16 | 1.05 | 1.7 | 90 | 60 |
| 17 | 1.05 | 3.0 | 40 | 60 |
| 18 | 1.05 | 2.8 | 20 | 20 |
| Comparative Embodiment | | | | |
| 1 | 1.05 | 2.1 | 30 | 20 |

A laser particle size test and a tapped density test are performed on the positive electrode material disclosed in the foregoing embodiments and comparative embodiments, and test results are recorded. Subsequently, a fresh positive electrode is prepared, and the quantity of particles of the positive electrode, the quantity of cavities, the total cross-sectional area S1 of the particles, and the total cross-sectional area S0 of the cavities are counted and measured according to the cross section preparation and counting method. Subsequently, a cycle performance test is performed on the lithium-ion battery, and test results are recorded.

Figure 2:
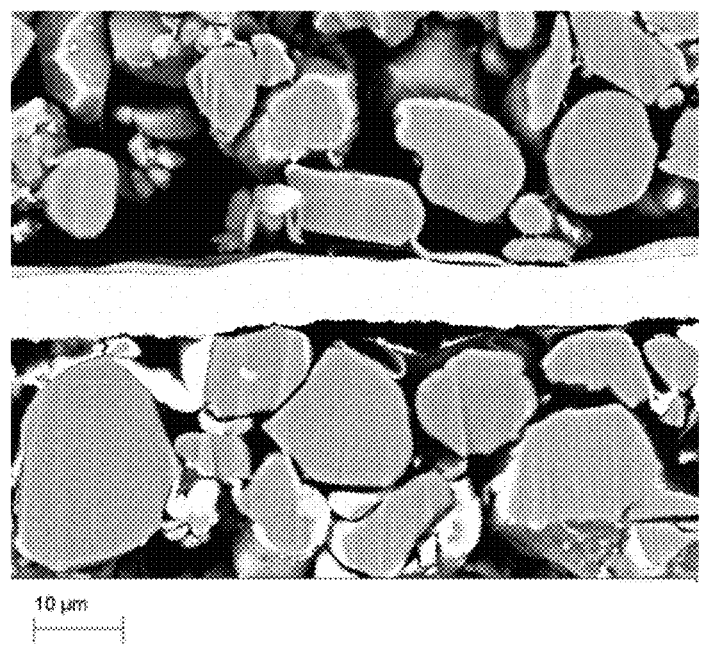
FIG. 2 is a scanning electron microscope (SEM) image of a positive electrode material according to Comparative Embodiment 1 of this application.
Figure 3:
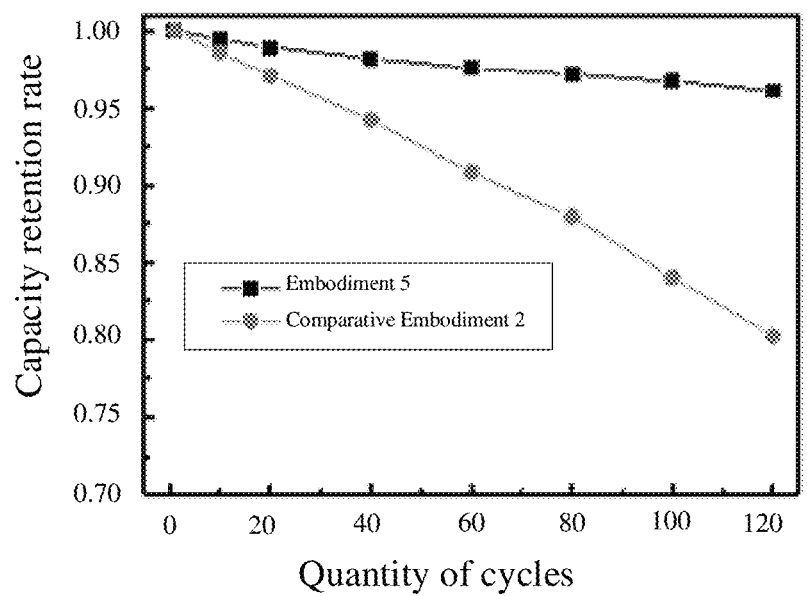
FIG. 3 is a comparison diagram of 120-cycle capacity retention rates of lithium-ion batteries that contain a positive electrode material disclosed in Embodiment 5 and a positive electrode material disclosed in Comparative Embodiment 1 of this application respectively.

Using Embodiment 5 and Comparative Embodiment 1 as examples, the SEM images of the positive electrode materials disclosed in Embodiment 5 and Comparative Embodiment 1 are shown in FIG. 1 and FIG. 2, respectively. Some particles in the positive electrode material disclosed in Embodiment 5 obviously have cavities according to this application, but no identifiable cavity exists in the positive electrode material disclosed in Comparative Embodiment 1. The test results of the cycle performance test on the lithium-ion batteries disclosed in Embodiment 5 and Comparative Embodiment 1 are shown in FIG. 3. In contrast with Comparative Embodiment 1, the cycle performance of the lithium-ion battery including the positive electrode material disclosed in Embodiment 5 of this application is enhanced significantly, and the 120-cycle capacity retention rate of the lithium-ion battery increases from 80.00% to 96.00%. This indicates that, by using the stress relief particles that include cavities inside, the positive electrode material according to this application can effectively improve the strain-resistant capability of the positive electrode material, reduce ruptures of the particles of the positive electrode material, and enhance the cycle performance of the lithium-ion battery.

The statistic values of the quantity of cavities of the positive electrode material disclosed in Embodiments 1-18 and Comparative Embodiment 1 and the results of the cycle performance test are shown in Table 2 below.

TABLE 2

| Embodiment | Total quantity of cavities in 100 particles of the positive electrode material | $S_0/S_1$ (%) | 120-cycle capacity retention rate at 4.5 V |
|---|---|---|---|
| 1 | 20 | 0.00191 | 84.54% |
| 2 | 55 | 0.00433 | 86.00% |
| 3 | 121 | 0.00942 | 91.12% |
| 4 | 160 | 0.01423 | 92.45% |
| 5 | 198 | 0.02122 | 96.10% |
| 6 | 311 | 0.03251 | 94.11% |
| 7 | 455 | 0.05167 | 92.81% |
| 8 | 591 | 0.07011 | 92.06% |
| 9 | 759 | 0.09222 | 91.89% |
| 10 | 1000 | 0.12491 | 91.72% |
| 11 | 24 | 0.00010 | 83.49% |
| 12 | 200 | 0.00441 | 90.18% |
| 13 | 195 | 0.01123 | 93.67% |
| 14 | 201 | 0.05162 | 92.20% |
| 15 | 199 | 0.10077 | 90.07% |
| 16 | 996 | 0.29791 | 82.37% |
| 17 | 4 | 0.00001 | 81.27% |
| 18 | 10 | 0.00002 | 81.11% |
| Comparative Embodiment | | | |
| 1 | 0 | 0.00000 | 79.99% |

As shown in Table 1 and Table 2, in Embodiments 1-18 of this application, a cobalt-containing oxide precursor is selected, the ratio of the cobalt-containing oxide precursor to the lithium salt is controlled, and the air flow speed in the sintering process is controlled, and therefore, cavities can be generated inside the particles of the positive electrode material, and the quantity of the cavities and the cross-sectional area ratio can be controlled. The quantity of cavities and the cross-sectional area ratio are related to the cycle capacity retention rate of the lithium-ion battery. As can be learned from comparison between Embodiments 1-18 and Comparative Embodiment 1, in contrast with Comparative Embodiment 1 in which no stress relief particle exists, the positive electrode material that includes stress relief particles in this application can effectively increase the cycle capacity retention rate of the lithium-ion battery. Especially, the total quantity of cavities included in 100 particles of the positive electrode material in Embodiments 1-16 falls in the range of 20 to 1000, the S0/S1 ratio is 0.00001% to 0.3%, and the cycle capacity retention rate of the lithium-ion battery can keep above 82.00%, and may even be higher than 90.00%, 95.00%, or 96.00%. This proves that the cavities inside the particles of the positive electrode material can relieve the stress in advance, thereby enhancing structural stability of the material. The cavities generated inside a part of particles of the positive electrode material can form the stress relief particles according to this application, thereby enhancing the strain-resistant capability of the particles of the positive electrode material and ensuring the cycle stability of the lithium-ion battery under a high voltage.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment(s) or example(s) in this application. In addition, specific features, structures, materials, or characteristics herein may be combined in one or more embodiments or examples in any appropriate manner.

Although illustrative embodiments have been demonstrated and described above, a person skilled in the art understands that the above embodiments shall not be construed as a limitation on this application, and changes, replacements, and modifications may be made to the embodiments without departing from the spirit, principles, and scope of this application.

What is claimed is:

1. A positive electrode material, comprising:
   a lithium composite oxide represented by a general formula $Li_xCo_aM_bO_{2-c}$, wherein M element comprises at least one of nickel (Ni), manganese (Mn), magnesium (Mg), aluminum (Al), Titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), or silicon (Si), and $0.8 \leq x \leq 1.2$, $0.8 \leq a \leq 1$, $0 \leq b \leq 0.2$, $-0.1 \leq c \leq 0.2$; and
   the positive electrode material comprises stress relief particles, wherein cavities are formed inside the stress relief particles;
   wherein a shape of a cross section of each cavity on a scanning electron microscope image satisfies the following relational expression:
   (a longest diameter of the cavity−a shortest diameter of the cavity)/the longest diameter of the cavity≤30%,
   wherein the longest diameter and the shortest diameter are a longest diameter and a shortest diameter that respectively pass through an area centroid of the cross section of the cavity, and the longest diameter of the cavity is larger than at least 100 nm.

2. The positive electrode material according to claim 1, wherein a quantity of the cavities in each stress relief particle is less than 500.

3. The positive electrode material according to claim 1, wherein a particle size Dv50 of the positive electrode material is 3 μm to 25 μm.

4. The positive electrode material according to claim 1, wherein the stress relief particles form 2% to 30% of the positive electrode material.

5. An electrochemical device, comprising:
   a positive electrode, comprising a positive active material layer, wherein the positive active material layer comprises a positive electrode material;
   a negative electrode; and
   a separator, wherein the separator is disposed between the positive electrode and the negative electrode;
   wherein the positive electrode material comprises a lithium composite oxide represented by a general formula $Li_xCo_aM_bO_{2-c}$, wherein M element comprises at least one of nickel (Ni), manganese (Mn), magnesium (Mg), aluminum (Al), Titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), or silicon (Si), and $0.8 \leq x \leq 1.2$, $0.8 \leq a \leq 1$, $0 \leq b \leq 0.2$, $-0.1 \leq c \leq 0.2$; and
   the positive electrode material comprises stress relief particles, wherein cavities are formed inside the stress relief particles;
   wherein a shape of a cross section of each cavity on a scanning electron microscope image satisfies the following relational expression:
   (a longest diameter of the cavity−a shortest diameter of the cavity)/the longest diameter of the cavity≤30%,
   wherein the longest diameter and the shortest diameter are a longest diameter and a shortest diameter that respectively pass through an area centroid of the cross section of the cavity, and the longest diameter of the cavity is larger than at least 100 nm.

6. The electrochemical device according to claim 5, wherein a quantity of the cavities in each stress relief particle is less than 500.

7. The electrochemical device according to claim 5, wherein a particle size Dv50 of the positive electrode material is 3 μm to 25 μm.

8. The electrochemical device according to claim 5, wherein the stress relief particles form 2% to 30% of the positive electrode material.

9. The electrochemical device according to claim 5, wherein in a cross section of the positive active material layer in a thickness direction, with the cross section being obtained by using an ion beam cross section polisher, a total quantity of the cavities in 100 particles of the positive electrode material is 20 to 1,000.

10. The electrochemical device according to claim 9, wherein in the cross section of the positive active material layer in the thickness direction, with the cross section being obtained by using the ion beam cross section polisher, a total cross-sectional area of the 100 particles of the positive electrode material is S1, a total cross-sectional area of the cavities in the 100 particles of the positive electrode material is S0, and S0/S1 is 0.00001% to 0.3%.

11. An electronic device, comprising an electrochemical device, the electrochemical device comprising:
   a positive electrode, comprising a positive active material layer, wherein the positive active material layer comprising a positive electrode material;
   a negative electrode; and
   a separator, wherein the separator is disposed between the positive electrode and the negative electrode;
   wherein the positive electrode material comprises a lithium composite oxide represented by a general formula $Li_xCo_aM_bO_{2-c}$, wherein M element comprises at least one of nickel (Ni), manganese (Mn), magnesium (Mg), aluminum (Al), Titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), or silicon (Si), and $0.8 \leq x \leq 1.2$, $0.8 \leq a \leq 1$, $0 \leq b \leq 0.2$, $-0.1 \leq c \leq 0.2$; and
   the positive electrode material comprises stress relief particles, wherein cavities are formed inside the stress relief particles;

wherein a shape of a cross section of each cavity on a scanning electron microscope image satisfies the following relational expression:

(a longest diameter of the cavity−a shortest diameter of the cavity)/the longest diameter of the cavity≤30%, wherein the longest diameter and the shortest diameter are a longest diameter and a shortest diameter that respectively pass through an area centroid of the cross section of the cavity, and the longest diameter of the cavity is larger than at least 100 nm.

12. The electronic device according to claim 11, wherein a quantity of the cavities in each stress relief particle is less than 500.

13. The electronic device according to of claim 11, wherein a particle size Dv50 of the positive electrode material is 3 μm to 25 μm.

14. The electronic device according to claim 11, wherein the stress relief particles form 2% to 30% of the positive electrode material.

15. The electronic device according to claim 11, wherein in a cross section of the positive active material layer in a thickness direction, with the cross section being obtained by using an ion beam cross section polisher, a total quantity of the cavities in 100 particles of the positive electrode material is 20 to 1,000.

16. The electronic device according to claim 15, wherein in the cross section of the positive active material layer in the thickness direction, with the cross section being obtained by using the ion beam cross section polisher, a total cross-sectional area of the 100 particles of the positive electrode material is S1, a total cross-sectional area of the cavities in the 100 particles of the positive electrode material is S0, and S0/S1 is 0.00001% to 0.3%.

* * * * *